April 5, 1927.  
E. L. HARRY  
1,623,724  
MOTOR VEHICLE TRANSMISSION MECHANISM  
Original Filed Feb. 28, 1924   2 Sheets-Sheet 1
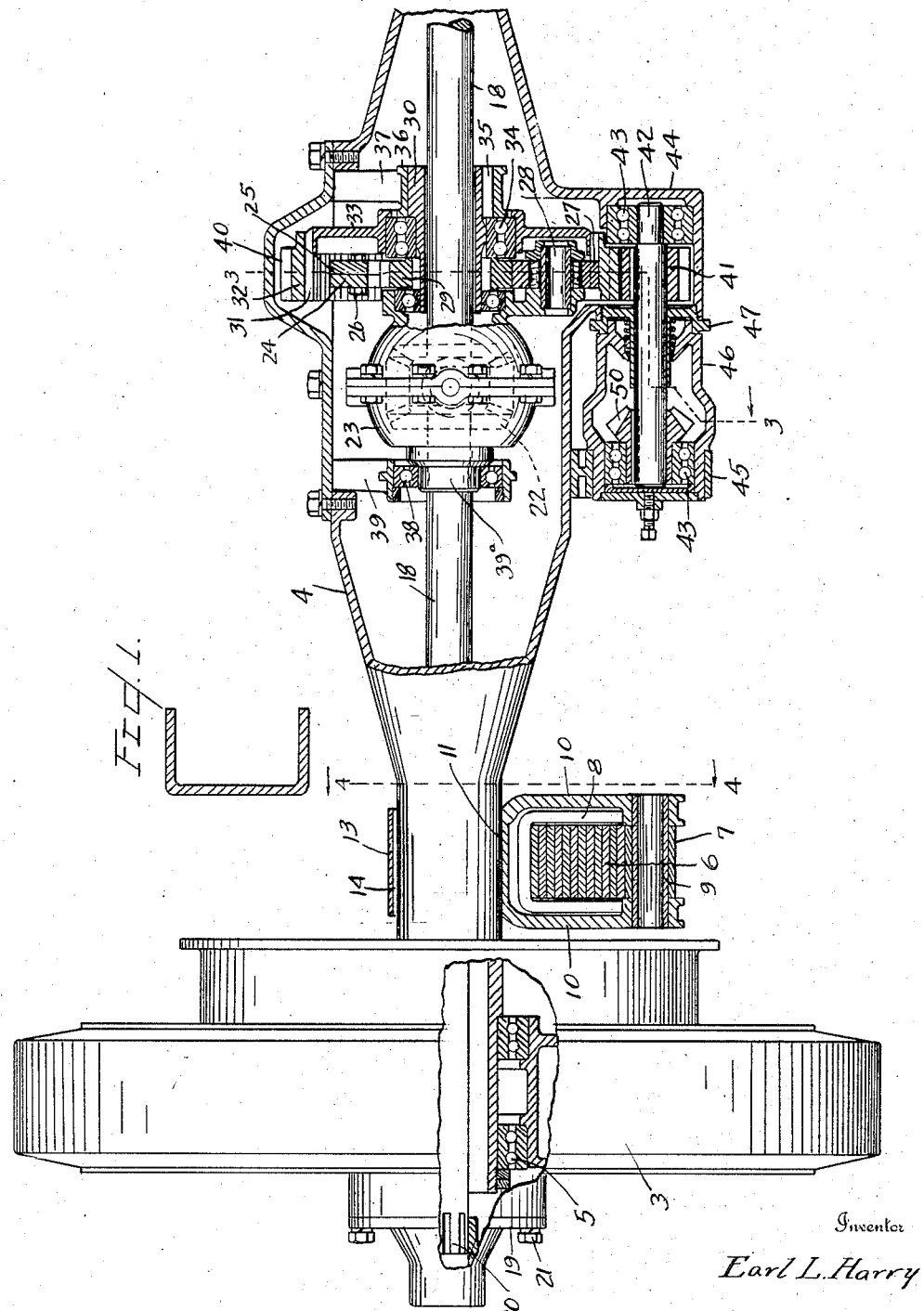
Inventor  
Earl L. Harry  
By  
Attorney April 5, 1927.
E. L. HARRY
1,623,724
MOTOR VEHICLE TRANSMISSION MECHANISM
Original Filed Feb. 28, 1924    2 Sheets-Sheet 2
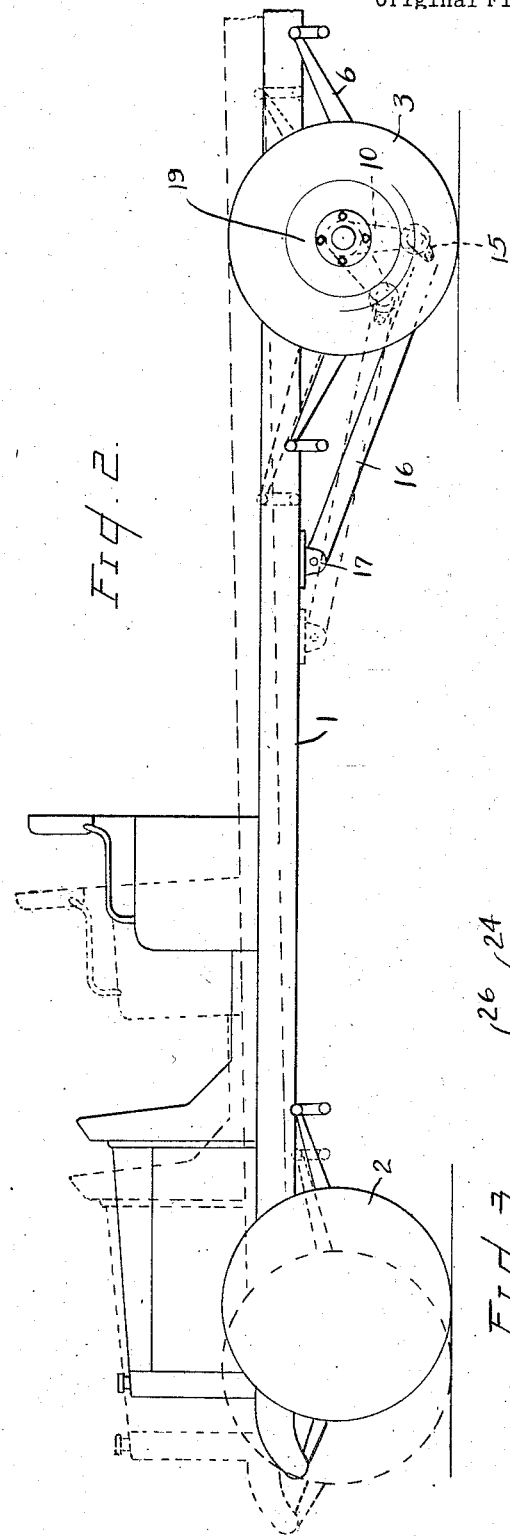
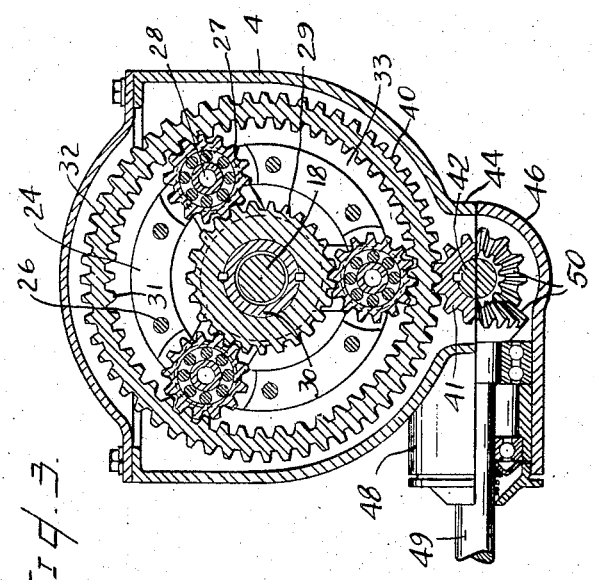
Inventor
Earl L. Harry
By
Attorney Patented Apr. 5, 1927.

1,623,724

UNITED STATES PATENT OFFICE.

EARL L. HARRY, OF PONTIAC, MICHIGAN, ASSIGNOR TO EDWARD S. EVANS, OF DETROIT, MICHIGAN.

MOTOR-VEHICLE TRANSMISSION MECHANISM.

Application filed February 28, 1924, Serial No. 695,632. Renewed December 27, 1926.

This invention relates to drive mechanisms for motor vehicles and more particularly for trucks and like heavy duty vehicles.

It is an object of the invention to provide for cushioning the shocks and stresses to which the driven parts are subjected upon initial establishment of the drive, particularly when a heavy resistance must be overcome, as when traction conditions are adverse, and it is also an object to cushion such shocks and stresses as are met with by the driven parts in transit of the vehicle, arising, for example, from a sudden application of the brakes or from an encounter of the vehicle wheels with some obstacle in the roadway.

A further object is to effect a shifting of the vehicle body and its load when the driving force encounters an abnormally heavy resistance, so that the load acts to a considerable extent to supplement the force applied by the vehicle motor in overcoming such resistance.

A feature of the invention is the attainment of the specified objects by the employment of gearing arranged in its entirety within the rear axle housing and thus adapted to run in lubricant and fully protected from dust and dirt.

In attaining these various and other objects, the invention contemplates, in a preferred embodiment thereof, the journaling of the rear axle housing in the wheels thereof, so as to provide for a rocking of said housing about the axis of said wheels, and rigidly mounting upon said housing depending arms, the lower ends of which seat the rear springs of the vehicle, the live axle within said housing being driven through a gearing re-acting upon the housing so that under an abnormal stress said housing is rocked in a direction to angularly advance and elevate said arms and the load which they terminally carry.

Said preferred embodiment is hereinafter described, and is illustrated in the accompanying drawings, wherein, Fig. 1 is a view in axial elevation, partly sectional, of a rear axle embodying the invention.

Fig. 2 is a side view of the complete vehicle showing in dash lines such an advanced position of the parts as may be established under an abnormal resistance to the driving force.

Fig. 3 is a cross section view through the gearing housed in the rear axle, the section being taken upon line 3—3 of Fig. 1.

Fig. 4 is a cross section through the rear axle on line 4—4 of Fig. 1, showing one of the load-carrying arms which depend from the housing of said axle.

In these views the reference character 1 designates the sills of the frame of a motor vehicle, 2 the front wheels thereof, 3 the rear wheels, and 4 the rear axle housing, the latter being terminally journaled in anti-friction bearings 5 within the hubs of the rear wheels. Leaf springs 6 of the so-called semi-elliptic type mount the frame upon the housing 4. Central seats 7 for said springs are clamped to the latter by U-bolts 8, and are pivotally mounted, as indicated at 9, upon the lower ends of paired arms 10. The upper ends of said arms are integrally connected, as indicated at 11 (Fig. 4), the portion 11 embracing the under side of the housing 4 and being clamped rigidly upon said housing by bolts 12 engaging a semi-circular saddle piece 13 surmounting said housing. 14 designates a key which insures turning of the arms 10 in unison with the housing 4 when the latter is rocked. As may be best seen in Fig. 4, a forwardly projecting lug 15 is formed integrally with the seat 7, and to said lug is pivoted the rear end of a radius rod 16, having its forward end pivoted at 17 to the frame 1.

Considering now the drive mechanism, 18 is the usual two-part live axle within the housing 4. The outer end of each part of said axle has a drive connection to the corresponding rear wheel through a hub cap 19 keyed to said live axle, as is seen at 20 in Fig. 1, and rigidly attached to said wheel by bolts 21. The usual differential bevel gears 22 establish a drive to the axle parts 18 from the casing 23 enclosing said gears, said gears and casing being arranged in the enlarged central portion of the housing 4. The invention also arranges in said portion a train of gearing which serves both to increase the ratio of speed reduction and to subject the housing 4 to a reaction torque for purposes hereinafter set forth. Thus the casing 23 of the differential gears integrally carries at one end a concentric ring 24 to which a companion ring 25 is secured by bolts 26. Portions of the rings 24 and 25 are spaced apart to accommodate pinions 27 journaled upon tubular shafts 28 which are jointly mounted in said rings. Said pinions mesh at their innermost points with a larger pinion 29 fast upon a sleeve 30 through which freely passes one of the live axle parts 18. At their outermost points the pinions 27 mesh with a gear 31 internally formed upon a gear ring 32 fast upon a disk or web member 33 which is journaled upon the sleeve 30 through anti-friction bearings 34. Said sleeve is keyed, as indicated at 35, to a bearing 36 which is rigidly supported from the housing 4 through an arm 37. At the opposite side of the differential casing 23 an anti-friction bearing 38, receiving a journal member 39ª on said casing, is carried by an arm 39 which is similarly rigidly carried by the housing 4. 40 is a gear externally formed upon the ring 32 and 41 is a pinion having driving engagement with said gear beneath the same. The pinion 41 is fast upon a shaft 42 journaled in anti-friction bearings 43, one of which is formed in a downward extension 44 of the housing 4, which extension receives the pinion 41, the other being carried in spaced relation to the extension 44 by a hanger 45 rigidly carried by the housing 4 therebeneath. A cylindrical casing 46 is journaled at its ends in the hanger 45 and in a bearing 47 carried by the extension 44 (see Fig. 1), and integrally with said casing there is formed a forwardly projecting bearing 48 (see Fig. 3) for the propeller shaft 49. Within the casing 46, a pair of bevel pinions 50 establish a drive from the propeller shaft to the shaft 42.

Considering now the operation of the described invention, and tracing first the drive to the wheel 19, the propeller shaft 49 drives the shaft 42 through the bevel pinions 50. The pinion 41 and gear ring 32 transmit the drive to the planetary pinions 27. The primary driving action of said pinions is expended in their planetary travel around the pinion 29, the latter being restrained by its rigid connection to the sleeve 30, which is itself rigidly carried by the housing 4 by the arm 37. By their planetary travel, said pinions rotatively drive the ring structure 24—25 which mounts said pinions. Said ring structure drives the differential casing, and the latter through the gears 22 drives the live axle 18. The latter through the cap 19 drives the wheel 3.

The pinions 27 have a secondary driving function, which they exercise only when the resistance to the drive is considerable. When such is the case the reaction thrust of said pinions exerted upon the control pinion 29 will overcome the resistance offered by the load to rocking of said pinion, and the latter will be rocked together with the sleeve 30 upon which it is fast, the housing 4 rigidly connected to said sleeve by the support 37, and the arms 10 which are rigidly carried by said housing. The direction of this movement is such as to swing said arms 10 forwardly and upwardly, thus acting through the springs 6 to raise and advance the frame 1 and the load of the vehicle. The extent to which the load is thus raised is proportionate to the resistance encountered by the drive, and the weight of the load is accordingly rendered reactive to supplement the driving force in overcoming tractive resistances.

What I claim is:

1. In a drive mechanism for motor vehicles, a live axle, a housing for said axle, a ground wheel carrying said housing and having driven engagement with said live axle, a member fast upon said housing and depending therefrom, means for supporting the vehicle load upon said depending member at a point normally below the housing, and drive mechanism for said axle within and reacting upon said housing rotatively, whereby said housing may rock under a predetermined driving stress to rotatively advance and elevate said load supporting member.

2. In a drive mechanism for motor vehicles, a two-part live axle, differential drive gears for the parts of said axle, a speed reduction gear train driving said differential gears, and a housing for said differential gears and speed reduction train adapted for a limited rotation about said live axle and reacted upon rotatively by said reduction train to absorb shocks arising from heavy resistance to the drive.

3. In a drive mechanism for motor vehicles, a ground wheel, drive mechanism therefor including a live axle, a housing carried by said ground wheel and enclosing said drive mechanism, adapted for a limited rotation about said live axle, and rotatively reacted upon by said drive mechanism, and means opposing the vehicle load to rotation of said housing.

4. In a drive mechanism for motor vehicles, a ground wheel, drive mechanism therefor, a housing carried by said ground wheel, enclosing said drive mechanism and rotatively reacted upon by said mechanism, and a load support rigidly depending from said housing and normally carrying the load at a point below the axis of said wheel, said support being angularly advanced and elevated upon a reactive response of said housing to said mechanism, whereby the load exercises a driving force supplemental to said mechanism.

5. In a drive mechanism for motor vehicles, a live axle, a member enclosing said axle, a load support, an arm depending from said enclosing member carrying said load support, and drive gearing for said live axle enclosed in and reacting upon said enclosing member, and effecting a rocking of said member and arm when the resistance to the drive exceeds the restraint exercised on said arm by the load.

6. In a drive mechanism for motor vehicles, a live axle, a housing for said axle, an arm depending rigidly from said housing, a load support upon said arm, a gear coaxial with said live axle within the housing, means rigidly connecting said gear to the housing, a pinion meshing with said gear, an annular gear having driving engagement with said pinion, and a mounting for said pinion actuable by orbital travel of the pinion to drive said live axle, the first mentioned gear being rotatively actuable by said pinion when the resistance to the drive exceeds the restraint imposed through said arm and housing upon the pinion, whereby the load is angularly lifted by said arm.

7. In a drive mechanism for motor vehicles, a live axle, a housing for said axle, a ground wheel carrying said housing and having driven engagement with said live axle, a member fast upon said housing and depending therefrom, means for supporting the vehicle load upon said depending member at a point normally below the housing, drive mechanism for said axle within and reacting upon said housing rotatively, whereby said housing may rock under a predetermined driving stress to rotatively advance and elevate said load supporting member, a propeller shaft, gearing establishing a drive from said shaft to said drive mechanism within the housing and a casing for said gearing pivotally carried by said housing.

8. In a drive mechanism for motor vehicles, a two-part live axle, differential drive gears for the parts of said axle, a speed reduction gear train driving said differential gears, and a member directly subjected to the reaction stress of said reduction gear train, adapted for a limited rotation about said live axle to absorb shocks arising from heavy resistance to the drive.

9. In a drive mechanism for motor vehicles, a live axle, a road wheel connected to and driven by said axle, a live axle housing rotatable in the wheel, a differential mechanism connected to the live axle, a plurality of pinions connected to the differential, a gear fixed to the housing, said pinions being rotatable about and in mesh with the gear, another gear rotatable about said pinions and in mesh therewith, a second housing rotatably supported from the first and having a shaft therein connected to said latter gear, means for driving said shaft, and load carrying springs supported on said first housing.

In testimony whereof I sign this specification.

EARL L. HARRY.